Mar. 27, 1923.
C. A. HAAS
1,450,077
RETAINING DEVICE FOR RECEPTACLE CAPS
Filed Oct. 18, 1921
Fig. 1,
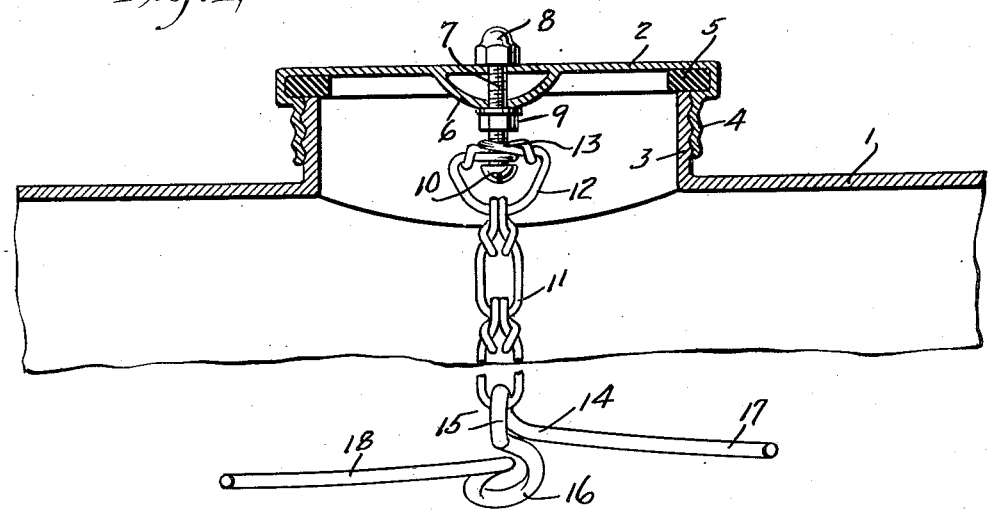
Fig. 2.
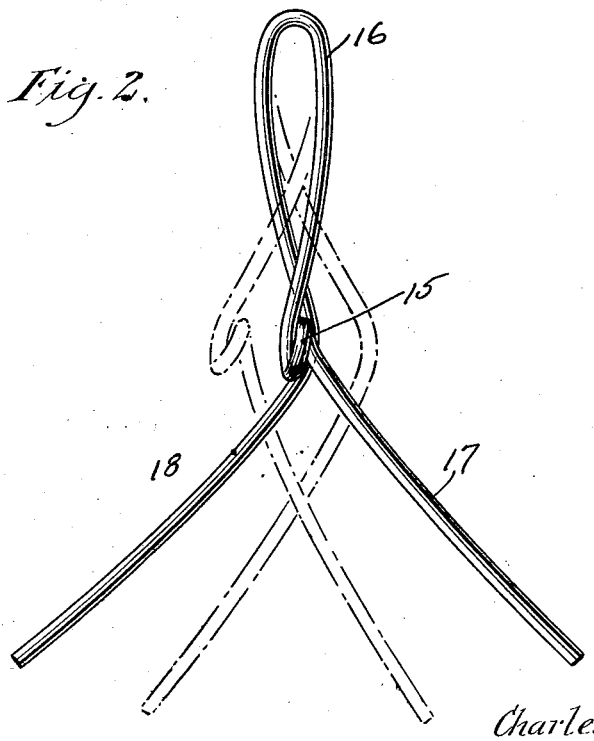
WITNESSES
Edw. Thorpe
Robert J. Hulsizer
INVENTOR
Charles A. Haas
BY
ATTORNEYS Patented Mar. 27, 1923.

1,450,077

UNITED STATES PATENT OFFICE.

CHARLES A. HAAS, OF NEW YORK, N. Y.

RETAINING DEVICE FOR RECEPTACLE CAPS.

Application filed October 18, 1921. Serial No. 508,502.

*To all whom it may concern:*

Be it known that I, CHARLES A. HAAS, a citizen of the United States, and a resident of the city of New York, Elmhurst, Flushing, borough of Queens, in the county of Queens and State of New York, have invented a new and Improved Retaining Device for Receptacle Caps, of which the following is a full, clear, and exact description.

This invention relates to a retaining device for caps of receptacles, and has for an object the provision of an economically manufactured, simple and efficient means whereby caps of receptacles such as automobile tanks can be retained in close association with the receptacles when they are removed to fill the tank and thereby are not very easily lost.

Another object resides in the provision of means whereby the threading of the cap on to the plug or opening of the receptacle can be effected unhampered in spite of the connection of the cap to means within the receptacle.

A further object resides in the particular construction and arrangement of parts which are hereinafter described and claimed and shown in the accompanying drawings.

The invention is shown in the drawings, in which—

Figure 1 is a section through the filling opening of the tank showing the cap and the retaining means connected thereto.

Fig. 2 is an enlarged detail view of the spring retaining member normally disposed within the tank.

The invention as shown in the drawings is a preferred form, although it is understood that the invention may take other forms and involve variations in the construction and arrangement of the parts without departing from the spirit thereof.

It is related to a tank or receptacle 1, preferably an automobile gasoline tank, which is provided with a cap 2 disposed in relation to a filling head 3 and provided with a threaded flange portion 4 cooperating with a similar threaded portion on the head 3. A rubber gasket 5 is disposed within the cap and bears on the top of the head 3 to make the joint liquid and air-tight. The cap is provided centrally with a spaced curved wall which in conjunction with the body portion 2 of the cap is suitably apertured to provide seats for a threaded screw 7 having nuts 8 and 9 to hold it in relation to the cap. The head 10 of the screw 7 is spaced from the nut 9. A chain formed of links such as 11 is connected through the screw 7. The link 12 of the chain, which is directly connected to the screw 7, is bent on both ends in a line transverse to the axis of the screw in the form of loops 13 to act as a sort of swivel link whereby the chain can turn with respect to the screw or vice versa. The other end of the chain is connected to a spring retaining member 14 made of any suitable flexible wire, preferably of considerable flexibility. One of the arms of this wire is formed in a small loop 15 to receive the lower chain link, and the main body portion of the wire is bent in a large loop as at 16 with flared oppositely extending portions 17 and 18 so that the dimensions, either the width or the length, of this spring member are such that it cannot come out of the filling opening of the tank except when the flared ends are bent to the position shown in dot-and-dash lines in Fig. 2.

In this manner I provide a simple and efficient construction, readily adapted to be attached to any type of receptacle and cap thereon, for permitting the cap to be removed therefrom but retained in close association with the receptacle so that it cannot be lost or mislaid.

What I claim is:

1. A retaining device for receptacle caps, which comprises a shaft fastened to said cap and extending inwardly therefrom, a chain connected to said shaft by one of its links, said link being bent into engagement with the shaft in a plane at right angles thereto and formed in a plurality of loops to act as a swivel and permit relative movement between the chain link and the shaft.

2. A retaining device for receptacle caps, which comprises a pin or shaft connected to the cap and extending therefrom, a one-piece chain link connected to said pin or shaft, a portion of the link embracing the shaft in the form of a plurality of loops in a plane at right angles to the shaft to form a swivel joint.

3. A retaining device for receptacle caps, which comprises a retaining member made of flexible material such as wire and having arms, a small loop formed in one of said arms, and a chain extending from said loop to the cap, the main body portion of the wire bent in a large loop and the ends of the wire being provided with flared oppositely extending portions so that any dimension of the retaining member will be too large to permit it being withdrawn from the tank except when the flared ends are bent toward each other.

CHARLES A. HAAS.